United States Patent [19]

Fischer et al.

[11] 4,256,854
[45] * Mar. 17, 1981

[54] POLYMERIZATION OF VINYLIC MONOMER IN PRESENCE OF BENZOTHIAZOL-HYDRAZONES

[75] Inventors: Edgar Fischer, Frankfurt am Main; Johannes Brandrup, Wiesbaden; Jürgen Weinlich, Burgkirchen, all of Fed. Rep. of Germany

[73] Assignee: Hoechst Aktiengesellschaft, Frankfurt am Main, Fed. Rep. of Germany

[*] Notice: The portion of the term of this patent subsequent to Mar. 6, 1996, has been disclaimed.

[21] Appl. No.: 971,525

[22] Filed: Dec. 20, 1978

[30] Foreign Application Priority Data

Dec. 24, 1977 [DE] Fed. Rep. of Germany ....... 2757924

[51] Int. Cl.$^3$ .................. C08F 2/00; C08F 14/06; C08L 27/06
[52] U.S. Cl. .................. 525/242; 525/328; 525/349; 526/62; 526/200; 526/202; 526/205; 526/257
[58] Field of Search .................. 526/62, 74

[56] References Cited

U.S. PATENT DOCUMENTS

| | | | |
|---|---|---|---|
| 3,669,946 | 6/1972 | Koyanagi | 526/62 |
| 4,098,972 | 7/1976 | Ogawa | 526/62 |
| 4,105,838 | 8/1978 | Kitamura | 526/62 |
| 4,143,097 | 3/1979 | Fischer | 526/62 X |

*Primary Examiner*—C. A. Henderson
*Attorney, Agent, or Firm*—Curtis, Morris & Safford

[57] ABSTRACT

The present invention provides a process for the manufacture of vinyl chloride polymers by polymerization of the monomer or monomer mixture in aqueous dispersion in the presence of radical-forming catalysts and optionally suspension stabilizers, emulsifiers and further polymerization auxiliaries, which comprises carrying out the polymerization in a reactor the inner walls of which and other parts where polymer deposits may form are coated partially or entirely with a coating containing determined compounds of the formula

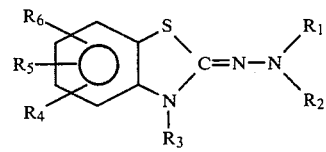

In accordance with this invention, a substantial suppression of polymer deposit formation is achieved especially in the case of vinyl chloride copolymers.

5 Claims, No Drawings

POLYMERIZATION OF VINYLIC MONOMER IN PRESENCE OF BENZOTHIAZOL-HYDRAZONES

The invention provides a process for the manufacture of vinyl chloride polymers with reduced formation of polymer deposits on the reactor walls, furthermore, the corresponding deposit-suppressing substances, coating systems containing these substances, and a polymerization vessel coated accordingly.

BACKGROUND OF THE INVENTION

In the manufacture of vinyl chloride polymers by polymerization in an aqueous medium, polymer deposits are formed on the inner walls of the polymerization autoclave and on the inserted devices. These deposits reduce the polymer yield and deteriorate the quality of the product, because part of these deposits coming off from the walls contaminate the final product by causing specks or fish-eyes. Furthermore, these deposits obstruct dissipation of the polymerization heat through the reactor walls, which results in unprofitably long reaction times.

Removal of such deposits is therefore absolutely required, which is usually carried out by mechanical means. Generally, pressurized water operated spray devices are employed for this purpose, which devices, however, remove the slightly adhering deposits only. Therefore, after every few batches, the reactor has to be cleaned manually with the trowel, and expensive safety measures have to be taken to protect the workers, so that these cleaning operations require much expenditure, cause long times of in-operation of the reactor and thus reduce considerably theprofitability of the manufacturing process.

Attempts have therefore been made to suppress or even avoid from the start such polymer deposits during the manufacture of vinyl chloride polymers in aqueous dispersion. A satisfactory solution of the problem, however, has not been found hitherto.

Some of the numerous processes described are based on the principle of reducing the formation of deposits by technological means; for example, scraping the walls of the reactor with a correspondingly shaped agitator; adjusting the wall temperature to at least the temperature of the reaction medium; cooling the reactor wall to −15° to 0° C.; feeding aqueous solutions, for example of salts of permanganic, chromic or dichromic acid, in the interface between the liquid and gaseous phases during the polymerization; polymerization while passing an electric current through the liquid reaction medium.

In other known processes, the components of the polymerization recipe are altered and/or further substance are added to the polymerization liquor.

Further known processes provide reactors with specially designed or coated inner walls in order to suppress the formation of deposits, for example walls having a roughness depth of less than 10 μm, in addition to the use of water-soluble, reducing inorganic salts and adjustment of defined agitator speeds; or an insoluble wall coating of a cross-linked polymer material containing polar groups, which has been prepared using an aldehyde as cross-linking component; or a wall coating consisting substantially of polyethylene-imine hardened by means of an urea, aldehyde or diisocyanate, while optionally adding a bivalent tin salt of an inorganic acid as inhibitor to the polymerization medium; or a uniform wall coating containing at least one polar organic nitrogen, sulfur or oxygen compound of an anionic or nonionic wetting agent, an organic dyestuff or an inorganic pigment. There have been described furthermore wall coatings of polyaromatic amines.

None of these known processes for reducing or preventing deposits in the polymerization reactor is fully satisfactory, because each of the processes has one or more of the following disadvantages:
insufficient prevention of deposit formation;
prolonged polymerization time, reduced yield;
contamination of the polymer by clouding or dyeing substances and particles of the deposit on the walls which have altered due to the influence of heat and cannot be decomposed but with great difficulty;
use of physiologically intolerable substances;
undesirable alteration of the processing properties of the polymer (enlarged grain size, reduction of heat resistance);
deteriorated activity on copolymerization and on use of certain initiators;
necessity of expensive surface shaping or pretreatment such as polishing;
insufficient reproducibility and limited modification possibilities of formulation and operation mode;
more or less heavy influence of flow conditions on the processes; places of high turbulence being especially critical, therefore necessity of constantly renewed search for optimum conditions with each change of scale and proportions;
special protection measures required for those reactor parts which are not in contact with the liquor, for example special spraying of dome and tubes;
waste water problems due to additives to the liquor.

In accordance with a method not being included as yet in the published state of the art, there has been proposed to use certain benzothiazol-2-one-hydrazone derivatives as deposit-suppressing substances in the polymerization of vinyl chloride.

OBJECTS OF THE INVENTION

It is therefore an object of the present invention to provide a process for the manufacture of vinyl chloride polymers which is free from the above disadvantages and which is superior to the hitherto known processes with respect to the combined items as cited above. A special object of this invention is to use in this process such deposit-preventing substances which are physiologically tolerable according to the actual state of scientific knowledge, or which are introduced into the polymerization liquor and the polymer in a physiologically tolerable concentration only. Another object of this invention is to provide a process the deposit-preventing effect of which is of long duration and sufficient also in the case of copolymerization of vinyl chloride.

SUMMARY OF THE INVENTION

These and further objects are achieved in accordance with this invention by carrying out the polymerization in a reactor the inner parts and inserts of which are partially or completely coated with a coating consisting of defined derivatives of benzothiazol-2-one-hydrazone.

In accordance with this invention, there is provided a process for the manufacture of vinyl chloride homopolymers, copolymers or graft polymers containing at least 50% by weight of polymerized vinyl chloride units by polymerization of the monomer or the monomer mixture in aqueous dispersion in the presence of radical-forming catalysts, optionally suspension stabilizers, emulsifiers and further polymerization auxiliaries, which comprises carrying out the polymerization in a reactor the inner walls of which and other parts where polymer deposits may form are coated entirely or partially with a coating containing a compound of the formula

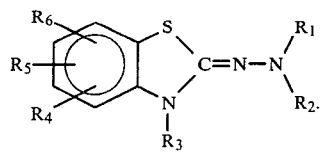

in which

R$_1$ is hydrogen, with the proviso that at least one of the radicals R$_4$ to R$_6$ must be carboxyl or sulfonic (—SO$_3$H), and none of the remaining radicals is hydrogen, or none of the radicals R$_4$ to R$_6$ is hydrogen, formyl, —(CH$_2$)$_x$—COOH (X=1, 2) or

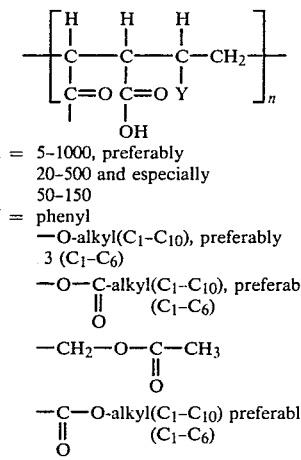

n = 5–1000, preferably
20–500 and especially
50–150

Y = phenyl
—O-alkyl(C$_1$-C$_{10}$), preferably 3 (C$_1$-C$_6$)
—O—C-alkyl(C$_1$-C$_{10}$), preferably (C$_1$-C$_6$)
  ‖
  O
—CH$_2$—O—C—CH$_3$
        ‖
        O
—C—O-alkyl(C$_1$-C$_{10}$) preferably (C$_1$-C$_6$)
 ‖
 O R$_2$ is hydrogen;
R$_3$ is hydrogen or an organic hydrocarbon radical having from 1 to 12 carbon atoms;
R$_4$ is R$_3$; furthermore an O-organic hydrocarbon radical having from 1 to 12 carbon atoms, hydroxyl, halogen, amino, (di)-alkylamino having from 1 to 12 carbon atoms, carboxyl, sulfonyl;
R$_5$, R$_6$ are R$_4$, or
R$_4$ and R$_5$ together are an aromatic ring.

This invention provides furthermore a polymerization vessel the inner walls of which and other parts where polymer deposits may form are coated partially or totally with the above coating system.

A further subject of the present invention are the components of the above formula, and deposit-preventing substances containing the above compounds.

DESCRIPTION OF PREFERRED AND OTHER EMBODIMENTS

In the aforementioned formula, the symbols have preferably the following meanings:

R$_1$ is hydrogen, with the proviso that at least one, preferably two, of the radicals R$_4$ to R$_6$ must be carboxyl or SO$_3$H, and none of the remaining radicals is hydrogen, or none of the radicals R$_4$ to R$_6$ is hydrogen;
R$_3$ is hydrogen, a hydrocarbon radical of aliphatic character (alkyl, cycloalkyl, aralkyl) having from 1 to 12 carbon atoms, especially a linear or branched alkyl radical having from 1 to 6 carbon atoms, for example methyl, ethyl, propyl, butyl, i-butyl or n-hexyl;
R$_4$ is R$_3$, or alkoxy having from 1 to 6 carbon atoms, such as methoxy, ethoxy, propoxy, hydroxyl, fluorine, chlorine, dialkylamino, carboxyl or sulfonyl;
R$_5$, R$_6$ are R$_4$ or
R$_4$ and R$_5$ together are an aromatic ring having from 6 to 10 carbon atoms, especially a benzene ring optionally substituted by one or more functional groups as cited sub R$_3$/R$_4$.

As indicated in the formula, the radicals R$_4$ and R$_5$ may be in any position at the benzene ring. Examples of combinations of R$_4$, R$_5$ and R$_6$ according to this invention are the following (alkyl and alkoxy hereinafter being radicals having from 1 to 6 carbon atoms): in the case where R$_4$ (or R$_5$ or R$_6$) is hydrogen:

4,5-dialkyl, 4,6-dialkyl, 5,6-dialkyl, 6,7-dialkyl, 5,7-dialkyl, 4(5)-alkyl-5(4)-alkoxy, 4(6)-alkyl-6(4)-alkoxy, 5(6)-alkyl-6(5)-alkoxy, 6(7)-alkyl-7(6)-alkoxy, 4(5)-alkyl-5(4)-chloro, 4(6)-alkyl-6(4)-chloro, 5(6)-alkyl-6(5)-chloro, 6(7)-alkyl-7(6)-chloro, 4(6)-alkyl-6(4)-hydroxy(amino), 4(5)-hydroxy(amino)-5(4)-alkyl, 4(6)-alkyl-6(4)-(di)alkylamino, 4(6)-hydroxy-6(4)-amino, 4(6)-hydroxy-6(4)-(di)alkylamino, 4(5)-alkyl-5(4)-carboxyl(sulfonyl), 5(6)-alkyl-6(5)-carboxyl(sulfonyl), 6(7)-alkyl-7(6)-carboxyl(sulfonyl), 4(6)-hydroxy-6(4)-carboxyl(sulfonyl), 6(7)-hydroxy-7(6)-carboxyl(sulfonyl),
in the case where R$_4$ (or R$_5$ or R$_6$) is not hydrogen:
5,6,7-trialkyl; 4,5,6-trialkyl; 5-alkoxy-6,7-dialkyl; 5,6-dialkyl-7-carboxy; 6,7-dialkyl-5-sulfonyl; 4,6-dialkyl-5-diethylamino; 5,7-dialkyl-6-hydroxy; 6,7-dialkyl-5-chloro; 6-alkyl-5-chloro-7-carboxy.

Preferred in accordance with this invention are compounds of the above formula in which R$_3$ and one of the radicals R$_4$ to R$_6$ are hydrogen, and espeially those compounds where two of these radicals R$_4$ to R$_6$ are hydrogen.

Typical representatives of compounds of the above formulae are the following:

benzothiazol-2-one($\beta$-formylhydrazone); (5-O-n-butylbenzothiazol-2-one-hydrazono)acetic acid, $\beta$(benzothiazol-2-one-hydrazono)propionic acid; 7-carboxybenzothiazol-2-one-hydrazone; benzothiazol-2-one-hydrazone-5-sulfonic acid; acid; 5-dimethylamino-benzothiazol-2-one-($\beta$-formyl-hydrazone); naphthothiazol-2-one-($\beta$-formyl-hydrazone); (5-t-butylbenzothiazol-2-one-hydrazono)acetic acid; 5-hydroxy-benzothiazol-2-one-($\beta$-formyl-hydrazone); 5-methoxybenzothiazol-2-one-($\beta$-formyl-hydrazone); (6-chlorobenzothiazol-2-one-hydrazono)acetic acid; 4,5-dimethyl-benzothiazol-2-one-($\beta$-formyl-hydrazone); 5,6-dimethyl-benzothiazol-2-one-($\beta$-formyl-hydrazone); (5-ethoxybenzothiazol-2-one-hydrazono)acetic acid; 5-methyl-7-carboxy-benzothiazol-2-one-hydrazone; 6,7-dimethylbenzothiazol-2-one-hydrazone-5-sulfonic acid; 5-chloro-7-carboxybenzothiazol-2-one-hydrazone; 5-ethoxy-6-methylbenzothiazol-2-one-($\beta$-formyl-hydrazone);

Reaction product of benzothiazol-2-one-hydrazone with
  1:1 copolymer of maleic anhydride + styrene
  1:1 copolymer of maleic anhydride + allyl acetate
  1:1 copolymer of maleic anhydride + vinyl acetate
  1:1 copolymer of maleic anhydride + vinylmethyl ether.

The following compounds may also be cited:
1-methylbenzothiazol-2-one-(β-formyl-hydrazone), 1-butyl-benzothiazol-2-one-(β-formyl-hydrazone), 1-ethyl-5-methoxy-benzothiazol-2-one(β-formyl-hydrazone), naphtho-thiazol-2-one-(β-formyl-hydrazone), 1-ethyl-5-chloro-benzothiazol-2-one-(β-formyl-hydrazone), 1,6-dimethyl-benzothiazol-2-one-(β-formyl-hydrazone), 1-propyl-7-chloro-benzothiazol-2-one-(β-formyl-hydrazone), 1-methyl-6-hydroxy-benzothiazol-2-one-(β-formyl-hydrazone), 1-methyl-7-carboxy-benzothiazol-2-one-(β-formyl-hydrazone), 1-methyl-4-methyl-6-hydroxy-benzothiazol-2-one-(β-formyl-hydrazone), 4-methyl-benzothiazol-2-one-(β-formyl-hydrazone), 5-methyl-benzothiazol-2-one-(β-formyl-hydrazone), 6-methyl-benzothiazol-2-one-(β-formyl-hydrazone), 7-methyl-benzothiazol-2-one-(β-formyl-hydrazone), 5-n-hexylbenzothiazol-2-one-(β-formyl-hydrazone), (5,6-dimethylbenzothiazol-2-one-hydrazono)-acetic acid, 6,7-dimethylbenzothiazol-2-one-(β-formyl-hydrazone), (5-methoxybenzothiazol-2-one-hydrazono)acetic acid, 5-chloro-benzothiazol-2-one-(β-formyl-hydrazone), 7-chloro-benzothiazol-2-one-(β-formyl-hydrazone), 7-hydroxy-benzothiazol-2-one-(β-formyl-hydrazone), 6-dimethyl-benzothiazol-2-one-(β-formyl-hydrazone), 5-carboxy-benzothiazol-2-one-(β-formyl-hydrazone), (7-carboxy-benzothiazol-2-one-hydrazono)acetic acid, (5-sulfonyl-benzothiazol-2-one-hydrazono)acetic acid, β(7-sulfonyl-benzothiazol-2-one-hydrazono)propionic acid, β(5-methyl-6-hydroxy-benzothiazol-2-one-hydrazono)propionic acid, (5-methyl-6-dimethylamino-benzothiazol-2-one-hydrazono)acetic acid, (5-methyl-7-carboxy-benzothiazol-2-one-hydrazono)acetic acid, (4-methyl-7-carboxy-benzothiazol-2-one-hydrazono)acetic acid, (4-methyl-7-sulfonyl-benzothiazol-2-one-hydrazono)acetic acid, (5-chloro-7-carboxy-benzothiazol-2-one-hydrazono)acetic acid, (4-hydroxy-7-carboxy-benzothiazol-2-one-hydrazono)propionic acid, β(5-carboxy-6-hydroxy-benzothiazol-2-one-hydrazono)propionic acid.

Of course, according to this invention the substances as defined above may be used also in the form of mixtures with each other.

Furthermore, the substances in accordance with this invention may be combined with known deposit-suppressing materials, for example compounds having azine or thiazine rings such as methylene blue, organic dyestuffs such as nigrosine black or aniline black, inorganic pigments as described in German Offenlegungsschrift No. 2,044,259, polymer imines according to German Offenlegungsschrift No. 2,357,867, or polyaromatic amines as disclosed in German Offenlegungsschrift No. 2,541,010.

Furthermore, the substances according to this invention may be used in combination with halides, hydroxides, oxides and carboxylates of any metal element according to German Offenlegungsschrift No. 2,557,788, especially tin-II salts; whereby complexes of substance of the invention and additive may be formed in situ. In certain cases, such metal complexes with the substance in accordance with this invention may be used from the start, for example complexes with copper, silver, zinc, tin, moybdenum, iron, cobalt, or nickel ions, as described in German Offenlegungsschrift No. 2,548,424.

Further additives may be for example antifoaming agents, antioxidants, wetting agents a.s.o.

The above additives are used above all in the case where a cross-linking substance or a mixture of such substances is used as carrier material, because this causes an especially efficient fixing on the surfaces to be coated, and because in the case of physiologically critical additives there is nearly no risk that they are introduced in a dangerous concentration into the polymerization liquor or the polymer.

By "coating" there are to be understood those coatings or surface coverings which are formed by bringing into contact a solution or dispersion of the substances of the invention with the specific inner parts of the reactor, for example by spraying, bathing a.s.o., or such coatings which are obtained by using in addition a film-forming, preferably cross-linking, carrier substance.

The quantity of substance according to the above formula to be applied amounts advantageously to more than 0.001 g/m$^2$, preferably more than 0.01 g/m$^2$. The upper limit is set above all by economic considerations, and is generally near about 0.1 g/m$^2$.

Because the compounds of the invention are oxidized by atmospheric oxygen or, for example, peroxidic initiators, the coatings obtained contain the oxidation products of the compounds of the above formula in addition to these compounds. It is to be assumed that the charge/transfer complexes formed on the coated surfaces are essential vehicles of activity.

The substance of the above formula may be fixed on the reactor parts to be coated, as already mentioned, in such a manner that an additional film-forming, preferably cross-linking, carrier substance is used; in the latter case the active substance of the invention may act in part or optionally in total as cross-linking component. The chemical bond so obtained causes an especially good fixation of the active substance in the coating, so that there is no risk of it being washed off. When carrier substances having no cross-linking action are used, the risk of washing-off may be overcome to a certain extent by adding furthermore a small amount of the active substance, for example from 1 to 100 ppm (relative to the weight of the monomer or monomer mixture), to the polymerization liquor.

Suitable film-forming carrier materials are in principle all lacquer systems ensuring the formation of a coating after hardening, which sufficiently resistant to the polymer liquor and to the monomer(s); that is, which shows no signs of dissolving or swelling even after several polymerizations.

Examples of such film-forming carrier materials are the following:

Conventional lacquers, cellulose derivatives, polyvinyl acetate, polystyrene, polyvinyl chloride. Suitable solvents or dispersing agents are conventional solvents, for example lower alcohols such as methanol, ethanol, m-or i-propanol, n- or i-butanol, ether alcohols such as monomethylglycol ether, ketones such as acetone, cyclohexanone, esters such as ethyl acetate, butyl acetate, chlorinated hydrocarbons such as methylene chloride, carbon tetrachloride, trichloroethane, trichloroethylene, aromatic substances such as benzene, toluene, xylene, dimethyl formamide, dimethyl acetamide, acetonitrile, or even water. Corresponding mixtures may also be used.

As already mentioned, there are used preferably so-called reactive systems, that is, cross-linking materials, as carrier materials in accordance with this invention, such as shellac, alkyd resins, and especially bicomponent or multicomponent systems on the bais of isocyanate/aldehyde or phenol/aldehyde, or especially on the basis of epoxide or anhydride.

Reactive systems on the basis of epoxide are for example those derived from multiaromatic or aliphatic glycidyl ethers, such as bisphenol A, diglycidyl ether or butanediol-diglycidyl ethers, copolymers of acrylic acid or methacrylic acid-glycidyl ester or maleic acid-glycidyl ester or purely aliphatic epoxides such as vinylcyclohexene-diepoxide. Alternatively, combinations of epoxides with isocyanate or phenol/formaldehyde systems may be used.

The epoxy group containing polymers or copolymers have advantageously a polymerization degree of from $10°$ to 500, preferably 20 to 250. Suitable comonomers are vinyl acetate, vinylalkyl ether or allyl acetate. Sytrene and (meth)acrylic acid ester and maleic acid ester may also be used. Advantageously, 2 epoxy groups should be present per molecule of the polymer or copolymer, and preferably from 10 to 25 mol % of the components of the polymer or copolymer should have epoxy groups.

Examples of cross-linking materials on the basis of anhydride are 1:1 copolymers of maleic anhydride especially with vinylalkyl ether, vinyl acetate or allyl acetate. The polymerization degree of these products should be normally from 50 to 1000.

Resin components on the basis of isocyanate are derived for example from hexamethylene- or toluylene-diisocyanate. Such compounds are known in polyurethane chemistry.

Suitable solvents for the resin components on the basis of epoxides are in principle the same as those already mentioned above for the non-cross-linking carrier materials, especially monoethers of glycol such as monomethyl- or monoerthylglycol ether.

Suitable solvents for the resin components on the basis of anhydrides are especially aprotic solvents such as acetone, methylethylene-ketone, cyclohexanone, dioxan, tetrahydrofuran, dioxolan, dimethyl formamide, dimethyl sulfoxide, glycol-dimethyl ether, diglycol-dimethyl ether or mixtures of these solvents.

The reactive systems may be hardened by addition of so-called hardeners. However, in the case of some systems, the active substance of the invention may act as hardener either partially or entirely. In other cases, hardening may be obtained by a heat treatment only.

Because of the particularly favorable processing conditions at high reactivity, suitable hardeners are especially the basic amine type systems, for example ethylene diamines, diethylene triamines, triethylene tetramines or xylylene diamines. Reaction products of these amines with phenol and formaldehyde have an especially favorable behavior. Furthermore, there may be used corresponding amine/epoxide resin adducts or adducts of polyols and polyisocyanates.

Al already mentioned, the active substance of the invention may act in principle as hardening component because of the amine groups contained therein.

In the case of epoxide systems, however, this is generally impossible because of the high reactivity degree of these systems; which means that the presence of a hardener is required in addition, otherwise the deposit-preventing function of the active substance would be deteriorated or even completely neutralized because of the essential active groups being blocked. Of course, this risk is the greater the smaller the amount of active substance used in the reaction system, and the less hydrogen atoms are present at the corresponding nitrogen atoms according to the above formula. The optimum hardener amount which depends among others on the reactivity of the harderner as compared to the active substance may be easily evaluated in a few small-scale tests; generally, from 0.8 to 1.2, preferably from 0.9 to 1.0 amine hydrogen per epoxide group should be present; 1 to 100%, preferably 1 to 10%, of which may be furnished by the active substance. Generally, the reactivity of the hardener should be considerably above that of the active substance, in order to incorporate it into the carrier but not to block it.

In the case of anhydride systems, however, the active substance alone may serve as hardener, because these anhydride systems are less reactive and cannot block totally all active groups. On the other hand, especially when employing small amounts of active substance, the additional use of a hardener is recommended, otherwise there would be the risk of incomplete hardening, and an insufficient deposit-suppressing effect would be the result.

The quantitative ratio of active substance to carrier material may vary within wide limits and the amount of carrier material is generally from 1 to 50, preferably 10 to 25, weight %.

The coating is applied in usual manner, for example by spraying or spreading the corresponding solution or dispersion, the viscosity of which is adjusted to a degree which ensures uniform coating; that is, to a solids content of generally about 5 to 40% by weight, preferably 10 to 25% by weight. The surface to be coated should be clean, free from fat and especially polymer deposits, and dry, in order to obtain a coating which lasts.

Coating may be carried out in a two-step or single-step process.

In the two-step process, the carrier, for example the anhydride, is applied first in the form of a solution. In the second step, the treatment with a solution of the active substance, optionally with addition of a hardener, is carried out. For the active substance and optionally the hardener, in principle the same solvents may be used as indicated above for the reactive systems and the non-hardening carrier materials, with the exception of the carbonyl compounds, because, on standing, they reduce the efficiency of the active substance. Lower alcohols or ether alchols, on the other hand, are well suitable, for example methanol, ethanol, propanols, butanols, monomethylglycol ether, monoethylglycol ether, phenoxyethanol.

On prolonged standing, the practically colorless, freshly prepared solutions of the active substances tend to take on a dark color; however, this does not at all affect their efficiency.

Less complicated than the two-step process is the single-step process preferred in accordance with this invention, which is especially advantageous in the case of epoxide carriers. For, the aprotic solvents required for the anhydrides can be omitted and physiologically tolerable solvents can be used, for example the above alcohols or ether alcohols. Solutions on this basis can be applied particularly easily by spreading or spraying, and they are distinguished by excellent flow and high spread. Despite a sufficient pot life, film formation and hardening occur very rapidly.

After having applied the coating, it is dried and subsequently, hardened. Depending on the state the surfaces to be coated are in, it may be advantageous to apply further coatings after drying or even after hardening, in order to ensure a complete covering of all surfaces.

Drying or hardening occurs generally at a temperature of from room temperature to 150° C., depending on the kind of the carrier material and the time of drying and hardening. Of course, elevated temperatures accelerate drying and hardening. In the case of epoxide systems, the temperatures are preferably from 40° to 100° C.; and from 60° to 150° C., especially from 70° to 110° C., in the case of anhydride systems. The heat may be supplied by blowing in correspondingly heated air or other gases, suitable heating devices being arranged in the interior of the reactor, or heating of the reactor walls by means of corresponding cooling or heating systems fixed to them.

The amount of coating mixture applied (active substance and carrier material or reactive system) is not critical in principle. For economic reasons and in order to ensure a good heat transfer, a coating as thin as possible has to be applied, while taking into consideration, however, that a complete covering has to be ensured. Of course, the state the surfaces to be coated, especially the reactor walls, are in has an influence on the necessary amount of coating agent per square meter, so that, in the case of a rough surface, it may be a multiple of that required for an absolutely smooth surface. Depending on the state of the surfaces to be coated, a layer thickness of from 1 to 100μ, preferably from 10 to 50μ, will be sufficient.

Preferably, however, because of their sufficient affinity to the corresponding reactor parts, the compounds of the invention are applied without additional carrier, that is, the surfaces to be coated are simply treated with a solution or dispersion of these compounds. Optionally, this treatment can be repeated several times after a corresponding intermediate drying and possible moderate heating. Generally, however, one single treatment is sufficient, which is carried out according to usual processes at normal temperature, for example by flushing, rinsing, painting and the like, generally before each new polymerization batch. It is recommended to rinse the treated surfaces before the polymerization with about the same amount of water or polymerization liquor, and to remove the solutions let off.

As solvent for the compounds of the invention for the preparation of the corresponding treatment solutions, there may be used, apart from water, preferably those solvents which are at least partially soluble in water (or which are water-miscible), for example lower alcohols such as methanol, ethanol, n- or i-propanol, n- or i-butanol; ether alcohols such as monomethylglycol ether; diglycol; ketones such as acetone; esters such as ethyl acetate, butyl acetate; dimethyl formamide, dimethyl acetamide, acetonitrile, and corresponding mixtures of these solvents with each other or with water.

Preferably, mixtures of water and lower alcohols having from 1 to 3 carbon atoms, especially water/methanol mixtures, are used; the water content of these mixtures being above 50 weight %, relative to the total mixture, depending on the solubility (which of course is a function of the kind of substituents) and the intended concentration. Substances carrying acidic or basic groups can be converted to aqueous or aqueous/alcoholic solutions by salt formation at a corresponding pH. Especially suitable are those compounds which become soluble at a pH of more than 7, preferably of from 8 to 10.5. In the acidic range, the activity of the substances is in general consideralby reduced.

The content of substance of the invention in the ready-for-use solutions may vary within wide limits, for example from 0.25 to 100 mmols per liter. In the case of oligomeric or polymeric radicals $R_1$, this indication relates to one heterocyclic group each of the above formula. However, the highly dilute solutions are very sensitive to oxidation by atmospheric oxygen and require substantially anaerobic operations. Solutions containing from 5 to 50 mmols of substance per liter are preferred, because they can be handled and applied under normal conditons, that is, in air.

The treatment solutions used for this process have a pronounced reducing power especially in the alkaline range; under these conditions, they are more or less autoxidizable with simultaneous discoloration. While partially oxidized solutions are not adversely affected with respect to their activity, (on the contrary, the charge/transfer complexes probably present therein may cause an even increased efficiency), totally oxidized solutions are practically ineffective. Therefore, it is recommended either to prepare the solutions freshly in each case, or, advantageously, to prepare and to stock them under nitrogen protection. The influence of atmospheric oxygen can furthermore be suppressed by adding reducing substances, thus increasing the stability and the activity of the solution. Examples of such reducing substances are hydrazine and the derivatives thereof, such as phenyl-hydrazine; zinc dust; complex metal hydrides, such as sodium boranate; reducing carbohydrates such as glucose; reductones such as ascorbic acid; tin(II) compounds such as tin chloride.

In order to increase the wetting properties of the ready-for-use solutions, the same dispersing or wetting agents can be added to them as those added to the suspension polymerization liquor; examples are described in our copending application Ser. No. 872,155, now U.S. Pat. No. 4,143,097.

Any polymerization vessel for the polymerization of ethylenically unsaturated compounds may be provided with the coating of the invention, with the proviso that carrier substances (laquers) are used in addition for the fixation. Thus, the surfaces to be coated may be of the most different materials, for example of glass, enamel or glaze, or metal, preferably steel. Since generally the most serious problems with respect to polymer deposits arise with reactors having metal (steel) inner surfaces, these latter ones are preferably coated with the coating of the invention, especially in the case where no carrier substances (lacquers) are employed.

In addition to the inner walls of the polymerization reactor, polymer deposits may form on the so-called inserts, such as agitator devices, flow interruptors (baffle plates), feeding tubes, valves, pumps, ducts, measuring instrumensts and inside coolers (heat exchangers), so that these devices have to be coated, too, either partially or completely; as well as outside coolers when they are attached directly or indirectly to the polymerization vessel.

In the process for the manufacture of vinyl chloride polymers in accordance with this invention, the polymerization as such is carried out in usual manner, continuously or batchwise, and there may be manufactured vinyl chloride homopolymers, copolymers or graft copolymers, with or without the use of a seed prepolymer etc. The polymerization may be carried out in aqueous dispersion, that is, in emulsion or suspension, in the presence of usual initiators, emulsifiers or suspension stabilizers, and optionally further polymerization auxiliaries.

Suitable initiators used advantageously in amounts of from 0.01 to 3% by weight, preferably 0.1 to 0.3% by weight, relative to the monomers, are for example the following:

diaryl, diacyl peroxides such as diacetyl, acetylbenzoyl, dilauroyl, dibenzoyl, bis-2,4-dichlorobenzoyl, bis2-methylbenzoyl peroxide; dialkyl peroxides such as di-tert.-butylperoxide; peresters such as tert.-butylpercarbonate, tert.-butylperacetate, tert.-butylperoctoate, tert.-butylperpivalate; dialkylperoxy-dicarbonates such as diisopropyl, diethylhexyl-, dicyclohexyl-, diethylcyclohexyl-perdicarbonates; mixed anhydrides of organic sulfoperacids and organic acids such as acetycyclohexyl-sulfonylperoxide; azo compounds known as polymerization catalysts such as azo-isobutyric acid nitrile; furthermore persulfates such as potassium, sodium or ammonium persulfate; hydrogen peroxide, tert.-butylhydroperoxide or other watersoluble peroxides, as well as corresponding mixtures. Peroxidic catalysts may also be used in the presence of from 0.01 to 1% by weight, relative to the monomers, of one or more reducing substances suitable for forming a redox catalyst system, for example sulfites, bisulfites, dithionites, thiosulfates, aldehyde sulfoxylates, for example formaldehyde-sulfoxylate. Optionally, the polymerization may be carried out in the presence of soluble metal salts, for example of copper, silver, iron or chrome; the amount being advantageously from 0.05 to 10 ppm (on the basis of metal, relative to monomer).

When the polymerization is carried out according to the suspension process, it may be operated in the presence of from 0.01 to 1% by weight, preferably 0.05 to 0.3% by weight, relative to the monomers, of one or more protecting colloids, for example polyvinyl alcohol containing optionally up to 40 mol % of acetyl groups, cellulosed derivatives such as water-soluble methyl cellulose, carboxymethyl cellulose, hydroxyethyl cellulose, methylhydroxypropyl cellulose, and gelatin, glue, dextran, or furthermore copolymers of maleic acid or the semiesters thereof and styrenes.

Furthermore, the polymerization may be carried out in the presence of from 0.01 to 5% by weight, relative to monomers, of one or more emulsifiers, the emulsifiers optionally being used in admixture with the above protecting colloids. As emulsifiers, there may be used anionic, amphoteric, cationic or nonionic ones. Examples of anionic emulsifiers are alkali metal salts, alkaline earth metal salts or ammonium salts of fatty acids as lauric, palmitic or stearic acid; of acidic fatty alcohol-sulfuric acid esters; of paraffinsulfonic acids; of alkylarylsulfonic acids such as dodecylbenzene- or dibutylnaphthalenesulfonic acid; of sulfosuccinic acid dialkyl esters; furthermore the alkali metal salts or ammonium salts of epoxy group containing fatty acids such as epoxystearic acid; of reaction products of peracids, for example peracetic acid with unsaturated fatty acids such as oleic or linoleic acid, or unsaturated oxy-fatty acids such as ricinoleic acid. Examples of amphoteric or cation-active emulsifiers are alkylbetains such as dodecylbetain, alkylpyridinium salts such as laurylpyridinium hydrochloride; furthermore alkylammonium salts such as oxyethyldodecylammonium chloride. Examples of nonionic emulsifiers are partial fatty acid esters of polyols such as glycerol-monostearate, sorbitol-monolaurate, -oleate or -palmitate; polyoxyethylene ethers of fatty alcohols or aromatic hydroxy compounds; polyoxyethylene esters of fatty acids or polypropylene-oxide/polyethylene-oxide condensation products.

Apart from the addition of catalysts, optionally protecting colloids and/or emulsifiers, the polymerization may be carried out in the presence of buffer substances, for example alkali metal acetates, borax, alkali metal carbonates, ammonia or ammonium salts of carboxylic acids; or in the presence of molecule size regulators, for example aliphatic aldehydes having from 2 to 4 carbon atoms, chlorinated or bromated hydrocarbons such as di- and tri-chloroethylene, chloroform, bromoform, methylene chloride, or mercaptans.

The polymerization temperature is generally from 30° to 100° C., the polymerization pressure from 4 to 40 atm/gge. and the pH from 3.5 to 8.

For the copolymerization with vinyl chloride, there are suitable for example one or more of the following monomers:

olefins such as ethylene or propylene; vinyl esters of linear or branched carboxylic acids having from 2 to 20, preferably 2 to 4 carbon atoms such as vinyl acetate, vinyl propionate, vinyl butyrate, vinyl-2-ethylhexoate; vinylisotridecanoic acid esters; vinyl halides such as vinyl fluoride, vinylidene fluoride, vinylidene chloride; vinyl ethers; vinyl pyridine; unsaturated acids such as maleic, fumaric, acrylic, methacrylic acid and the mono- or diesters thereof with mono- or dialcohols having from 1 to 10 carbon atoms; maleic anhydride, maleimide and the N-substitution products thereof with aromatic cycloaliphatic and aliphatic substituents optionally branched; acrylonitrile; styrene.

For the graft copolymerization, there may be used for example elastomeric polymers, obtained by polymerization of one or more of the following monomers:
dienes such as butadiene, cyclopentadiene; olefins such as ethylene, propylene; styrene; unsaturated acids such as acrylic or methacrylic acid and the esters thereof with mono- or dialcohols having from 1 to 10 carbon atoms; acrylonitrile; vinyl compounds such as vinyl esters of linear or branched carboxylic acids having from 2 to 20, preferably 2 to 4, carbon atoms; vinyl halides such as vinyl chloride or vinylidene chloride.

After the polymerization, there may be added further substances for stabilizing and improving the processing properties to the polymers obtained in the form of aqueous dispersions. Subsequently, the dry polymer is prepared according to the usual methods of work-up.

The copolymers or graft copolymers obtainable according to this invention contain at least 50% by weight, preferably at least 80% by weight, of polymerized vinyl chloride units.

The process of the invention is preferably suitable for the polymerization in aqueous suspension with the use of oil-soluble initiators and with addition of at least one protecting colloid (suspension stabilizer), and especially for the manufacture of vinyl chloride polymers, and preferably vinyl chloride copolymers containing at least 50 weight %, preferably 80 to 99 weight %, of polymerized vinyl chloride units.

The substances of the invention are prepared according to known methods, for example by reaction of 2-halogen (especially chlorine or bromine), or 2-thiobenzothiazoles optionally correspondingly substituted at the benzene nucleus, with hydrazine, and subsequent introduction of the radical $R_1$. Alternatively, they may be prepared by reaction of the above benzothiazole derivatives with the correspondingly substituted hydrazine derivatives.

The formyl compounds may for example be obtained according to the first operation mode by treating the corresponding benzothiazol-2-one-hydrazone with excess 20–100% formic acid at elevated temperatures of from about 75° to 110° C. Optionally, this reaction may be carried out in the presence of solvents not adversely affecting the formylation, such as ethers, for example dioxan or tetrahydrofuran, or esters such as formic acid ester.

The carboxyalkylated products are for example obtained by reacting the corresponding benzothiazol-2-onehydrazones with alkali metal salts of the corresponding halocarboxylic acids in a mixture of water and a $C_1-C_3$-alcohol at boiling temperature and a pH of more than 7, preferably 8 to 12. In the case where these compounds are used as deposit-suppressing agent, isolation is not necessarily required; the solutions obtained may be worked up as such, that is, they may be diluted and provided with further additives.

The oligomeric or polymeric maleic anhydride copolymer radical may be introduced into the oligomeric or polymeric acetylated benzothiazol-2-one-hydrazones advantageously in solution at about 75° to 100° C.; esters such as ethyl or propyl acetate, especially O-methylglycol acetate, or ethers such as dioxan or tetrahydrofuran being suitable solvents.

The process of the invention allows the manufacture of many polymer batches over prolonged periods and without troublesome formation of deposits on the walls and inserts of the reactor, thus ensuring a constantly good heat transfer to the walls of the vessel, which transfer is practically not affected by the thin layer of coating, and therefore a uniform quality of the product is the result. Time-consuming, capacity-reducing wall cleaning operations are no longer required, furthermore a hitherto inevitable frequent opening of the reactor involving the noxious vinyl chloride emissions is avoided. In the case of continuous polymerization, the periods until operations have to be stopped can be prolonged by a multiple.

The process of the invention is nearly not critical as to changes in formulation and/or operation mode, and it furnishes a product the processing properties of which are not adversely affected, as this is often the case in hitherto known processes.

Since the compounds of the invention are sufficiently metallophilic, they are preferably fixed on the corresponding reactor parts without using a carrier (lacquer). This operation mode is especially advantageous, because this saves the times for drying the reactor before the treatment of the walls and for hardening of the coating after the treatment. Thus, a considerable increase of capacity is ensured.

In the case of using water or water/alcohol mixtures having a high water content, this operation mode, as compared to the additional use of lacquer systems, has the further advantage of increased safety, since the risk of explosions is condiderably reduced.

With respect to efficiency, too, this operation mode without using a carrier offers several advantages. The most important one resides in the fact that a deposit which has possibly formed generally disappears automatically in the course of the following batches when the operations are continued, instead of rapidly growing further as this is normally the case. This tendency of spontaneous healing is observed above all in the case of active substances on a non-polymer carrier. After a certain operation time, a kind of passivation of the reactor may even be the result in some cases, that is, the deposit-forming tendency is considerably reduced for some time without using the deposit-preventing agent. However, deposits are formed anew to an increased extent if the deposit-preventing agent is not applied at all later on.

Because of their complex-forming properties, the compounds of the invention, apart from their use as depositpreventing agents, may be applied advantageously also in the fields of corrosion inhibition and electroplating, as well as as polymerization inhibitors.

The following Examples illustrate the invention.

EXAMPLES 1 to 6

(A) General prescription

The complete inner surface, free from deposits and dry, of a 400 liter stainless steel reactor (including agitator), that is, about 3 $m^2$, is sprayed in water-moist state (previous drying not required since practically of no influence on the efficiency) with 2000 ml of the corresponding ready-for-use solution at normal temperature, and subsequently after-treated with the same amount of water. The liquid collected on the bottom of the reactor is then removed. After having introduced 200 liters of deionized water containing 90 g of partially saponified polyvinyl acetate and 60 g of methylhydroxypropyl cellulose in dissolved form, the reactor is closed. After having driven out the air, 100 kg of vinyl chloride are charged, and activator solutions of 53 g of di-2-ethyl-hexyl-peroxidicarbonate (40% in aliphatic substance) and 27 g of tert.-butyl-perpivalate (75% in aliphatic substance) are added. The reactor is heated to 53° C. with agitation, and the temperature is maintained until the pressure has dropped to 4.0 atm/gge. After termination of the test, the reaction mixture is cooled, the polymerization vessel is depressurized and discharged. After rinsing with water, the reactor is examined.

In this manner, the number of batches as indicated are operated one after the other, and the vessel is flushed again with deposit-preventing agent before each batch. (Results see Table)

(B) Preparation of the products used

Benzothiazol-2-one-hydrazone-sulfonic acid

25 Parts by weight of benzothiazol-2-one-hydrazone are introduced into a mixture of 180 parts by weight of 100% sulfuric acid (monohydrate) and 90 parts by weight of 20% oleum, which causes the temperature to rise to 75° C. Subsequently, the temperature is raised to 80° C. for 15 minutes, and the system is then introduced into 400 parts by weight of ice. The precipitate is suction-filtered, washed with acetyl acetate and dried. The yield is 34.5 parts by weight of sulfonic acid; the melting point is above 300° C.

Ready-for-use solution P

30 Parts by weight of the sulfonic acid obtained are introduced into a mixture of 600 parts by weight of methanol, 10 parts by weight of a partially saponified polyvinyl alcohol, and 10 000 parts by weight of water, and the pH is adjusted to 9.5–10 by means of sodium hydroxide solution.

7-carboxy-benzothiazol-2-one-hydrazone (a) 7-carboxy-2-aminobenzothiazole 27.4 Parts by weight of anthranilic acid are suspended in 200 parts by weight of water at 20°–30° C. A solution of 78 parts by weight of KSCN in 200 parts by weight of water is added. A solution of 130 parts by weight of $FeCl_3$, 55 parts by weight of concentrated hydrochloric acid and 260 parts by weight of water is added within 30 minutes to the above mixture, and the batch is agitated for 2 hours at room temperature, and then for 2 hours at 65°–70° C. The batch is then cooled to 0° C., suction-filtered and washed at 0°–5° C. with dilute hydrochloric acid (1:4), until the liquid let off has become transparent. The filter cake is dissolved in 500 parts by weight of water with addition of sodium hydroxide solution until a pH of 9 is adjusted, boiled with animal charcoal, filtered hot and precipitated with acetic acid, then suction-filtered, washed with water and dried.

Yield of 7-carboxy-2-amino-benzothiazole: 19 parts by weight, m.p. 215° C.

(b) 7-carboxy-benzothiazol-2-one-hydrazone

25 Parts by weight of 7-carboxy-2-aminobenzothiazol are heated to 140° C. for 2 hours with 100 parts by weight of glycol and 13 parts by weight of hydrazine-hydrate and 10 parts by weight of hydrazine-chlorohydrate. After the batch has been cooled by means of ice, it is suction-filtered and washed with ethyl acetate.

Yield: 18.2 parts by weight of 7-carboxy-benzothiazol-2-one-hydrazone.

Ready-for-use solution Q

26 Parts by weight of 7-carboxy-benzothiazol-2-one hydrazone are introduced into a mixture of 600 parts by weight of methanol, 10 parts by weight of a partially saponified polyvinyl alcohol and 10 000 parts by weight of water, and the pH is adjusted to 9.5–10 by means of hydrochloric acid.

Benzothiazol-2-one-(β-formyl-hydrazone)

100 Parts by weight of benzothiazol-2-one-hydrazone are heated for 1 hour to 100° C. with 100 parts by weight of concentrated formic acid and 350 parts by weight of water. After cooling, the batch is suction-filtered, washed with water and dried.

Yield: 98 parts by weight, m.p. 228°–229° C. (decomposition).

Ready-for-use-solution R

25 Parts by weight of benzothiazol-2-one-(β-formyl-hydrazone) are suspended in 500 parts by weight of methanol, and the suspension is introduced into a solution of 16 parts by weight of partially saponified polyvinyl alcohol in 10 000 parts by weight of water, and the pH is adjusted to 9.5–10.

Polymer-bound benzothiazol-2-one-hydrazone 16.5 Parts by weight of benzothiazol-2-one-hydrazone are dissolved at 80° C. in 1000 parts by weight of methylglycol acetate. Subsequently, a solution of 156 parts by weight of a 1:1 copolymer of maleic anhydride with methylvinyl ether in 1000 parts by weight of methylglycol acetate is slowly added with agitation. The precipitated product is suction-filtered, washed with methanol and dried at 30° C. under reduced pressure.

Yield: 318 parts by weight; m.p. (dec.): 275° C.

Ready-for-use solution S

40 Parts by weight of the product so obtained are suspended in 500 parts by weight of methanol, and the suspension is introduced into a solution of 5 parts by weight of partially saponified polyvinyl alcohol in 10 000 parts by weight of water. The pH is then adjusted to 9.5–10 by means of sodium hydroxide solution.

Carbomethoxylated benzothiazol-2-one-hydrazone 21 parts by weight of benzothiazol-2-one-hydrazone are refluxed under a nitrogen blanket for 40 minutes with 14.8 parts by weight of Cl-CH$_2$-COONa in 100 parts by weight of isopropanol and after having added 100 parts by weight of 2 N sodium hydroxide solution.

Ready-for use solution T

The yellow solution so obtained is suitable for direct preparation of a ready-for-use solution. For this purpose, it is diluted with a solution of 10 parts by weight of partially saponified polyvinyl alcohol in 10,000 parts by weight of water.

| Example | Treatment with | State of reactor after batches | | | |
|---|---|---|---|---|---|
| | | 1 | 3 | 5 | 10 |
| 1 | P | bright | bright | some small dull spots | no dull spots, bright |
| 2 | Q | bright | some small dull spots | dull spots unchanged | dull spots disappeared, bright |
| 3 | R | bright | few dull spots | dull spots nearly disappeared | no dull spots, bright |
| 4 | S | bright | few dull spots | surface slightly dull | surface slightly dull, unchanged |
| 5 | T | bright | bright | bright | bright |
| 6* | without | some small dull spots | white shining deposit nearly uninterrupted ca. 36 g/m$^2$ | paper-like deposit abt. 185 g/m$^2$ | thick bark-like deposit 1550 g/m$^2$ |

*comparison

What is claimed is:

1. A process for the manufacture of vinyl chloride homopolymers, copolymers or graft polymers containing at least 50% by weight of polymerized vinyl chloride units by polymerization of the monomer or the monomer mixture in aqueous dispersion in the presence of radical-forming catalysts which comprises carrying out the polymerization in a reactor the inner walls of which and the other parts where polymer deposits may form are coated at least partially with a coating containing a compound of the formula

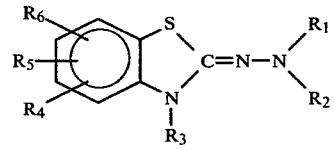

in which
R$_1$ is hydrogen, with the proviso that at least one of the radicals R$_4$ to R$_6$ must be carboxyl or sulfonic (—SO$_3$H), and none of the remaining radicals is hydrogen, or none of the radicals R$_4$ to R$_6$ is hydrogen, formyl, —(CH$_2$)$_x$—COOH (x=1, 2) or

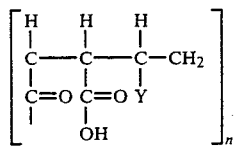

wherein n=5 to 1000,

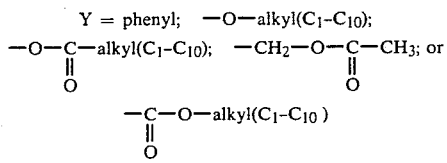

$R_2$ is hydrogen;

$R_3$ is hydrogen or an aliphatic hydrocarbon radical having from 1 to 12 carbon atoms;

$R_4$ is $R_3$; or an O-hydrocarbon radical having from 1 to 12 carbon atoms, hydroxyl, halogen, amino, (di)-alkylamino having from 1 to 12 carbon atoms, carboxyl, or sulfonic;

$R_5$ and $R_6$ are defined as in $R_4$, or $R_4$ and $R_5$ together are an aromatic ring.

2. The process as claimed in claim 1, wherein $R_1$ and $R_3$ are hydrogen.

3. The process as claimed in claim 1, wherein two of the radicals $R_4$ to $R_6$ are hydrogen.

4. The process as claimed in claims 1, which comprises rinsing the coated surfaces with water before the polymerization.

5. A process according to claim 1 wherein said coating contains carbomethyoxylated benzothiazol-2-one-hydrazone.

* * * * *